US012621495B2

(12) United States Patent
Wang

(10) Patent No.: US 12,621,495 B2
(45) Date of Patent: May 5, 2026

(54) METHOD, APPARATUS, AND MEDIUM FOR POINT CLOUD CODING

(71) Applicant: Bytedance Inc., Los Angeles, CA (US)

(72) Inventor: Ye-Kui Wang, Los Angeles, CA (US)

(73) Assignee: BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/749,462

(22) Filed: Jun. 20, 2024

(65) Prior Publication Data

US 2024/0348834 A1     Oct. 17, 2024

Related U.S. Application Data

(63) Continuation of application No. PCT/US2022/081953, filed on Dec. 19, 2022.

(60) Provisional application No. 63/265,758, filed on Dec. 20, 2021.

(51) Int. Cl.
*H04N 19/70*          (2014.01)
*H04N 19/172*         (2014.01)
*H04N 19/174*         (2014.01)

(52) U.S. Cl.
CPC ........... *H04N 19/70* (2014.11); *H04N 19/172* (2014.11); *H04N 19/174* (2014.11)

(58) Field of Classification Search
CPC .................................................... H04N 19/70
See application file for complete search history.

(56) References Cited

U.S. PATENT DOCUMENTS

| | | | |
|---|---|---|---|
| 2005/0185937 A1* | 8/2005 | Comer | H04N 21/234327 |
| | | | 386/334 |
| 2021/0005016 A1 | 1/2021 | Oh | |
| 2021/0029187 A1 | 1/2021 | Oh | |
| 2021/0329052 A1 | 10/2021 | Oh | |
| 2023/0222693 A1 | 7/2023 | Takahashi et al. | |
| 2024/0422355 A1* | 12/2024 | Hur | H04N 19/51 |

FOREIGN PATENT DOCUMENTS

| | | |
|---|---|---|
| JP | 2024540714 A | 11/2024 |
| WO | 2021251141 A1 | 12/2021 |

OTHER PUBLICATIONS

International Search Report for PCT/US2022/081953, mailed Mar. 29, 2023, 3 pages.

(Continued)

*Primary Examiner* — Jerry T Jean Baptiste
(74) *Attorney, Agent, or Firm* — Astute IP Law Group

(57) ABSTRACT

Embodiments of the present disclosure provide a solution for point cloud coding. A method for point cloud coding is proposed. The method comprises: performing a conversion between a point cloud sequence and a bitstream of the point cloud sequence based on a tile inventory, the tile inventory being valid starting from a first coded point cloud frame in the bitstream, the first coded point cloud frame immediately following a data unit for the tile inventory in a bitstream order, or the first coded point cloud frame following the data unit in the bitstream order and having a frame counter partially indicated in the data unit. Thereby, the proposed method can advantageously better support the application of the tile inventory.

20 Claims, 5 Drawing Sheets

400

402

PERFORM A CONVERSION BETWEEN A POINT CLOUD SEQUENCE AND A BITSTREAM OF THE POINT CLOUD SEQUENCE BASED ON A TILE INVENTORY

(56)          References Cited

OTHER PUBLICATIONS

Decision to Grant for Japanese Patent Application No. 2024-537413, mailed on Jul. 29, 2025, 5 pages.
Office Action for Korean Patent Application No. 10-2024-7020653, mailed on Jun. 19, 2025, 10 pages.
"MPEG 3DGC report from the 132 MPEG meeting @ online (1st WG 7 meeting)", ISO/IEC JTC1/SC29/WG 7, MPEG 3D Graphics Coding, Convenorship: AFNOR (France), No. 19899, Jan. 15, 2021, 51 Pages.
"Information technology—Coded representation of immersive media—Part 9: Geometry-based point cloud compression", ISO/IEC WD 23090-9:2022(E), ISO/IEC JTC 1/SC 29NVG 7, Secretariat: JISC, Jul. 15, 2022, 194 Pages.
Extended European Search Report for European Patent Application No. 229126339, mailed on Nov. 13, 2025, 12 pages.
Flynn et al., "G-PCC Multi-frame Sequence Coding", ISO/IEC JCTC I/SC29/WG 11 MPEG/m51025, Oct. 2019, Geneva, Switzerland, International Organisation for Standardisation Organisation Internationale De Normalisation ISO/IEC JTC1/SC29/WG11 Coding of Moving Pictures and Audio, Oct. 3, 2019, 2 Pages.
Kim et al., "[VPCC] Persistence scope of SEI messages", Apple, Input contribution, ISO/IEC JTC1/SC29/WG 11 MPEG/m53346, Apr. 2020, Teleconference, International Organisation for Standardisation Organisation Internationale De Normalisation ISO/IEC JTC1/SC29/WG 11 Coding of Moving Pictures and Audio, 18 pages.

* cited by examiner

METHOD, APPARATUS, AND MEDIUM FOR POINT CLOUD CODING

CROSS REFERENCE TO RELATED APPLICATIONS

This application is a continuation of International Application No. PCT/US2022/081953, filed on Dec. 19, 2022, which claims the benefit of the U.S. Provisional Application No. 63/265,758, filed Dec. 20, 2021. The entire contents of these applications are hereby incorporated by reference in their entireties.

FIELD

Embodiments of the present disclosure relates generally to point cloud coding techniques, and more particularly, to signaling of tiles in geometry based point cloud compression.

BACKGROUND

A point cloud is a collection of individual data points in a three-dimensional (3D) plane with each point having a set coordinate on the X, Y, and Z axes. Thus, a point cloud may be used to represent the physical content of the three-dimensional space. Point clouds have shown to be a promising way to represent 3D visual data for a wide range of immersive applications, from augmented reality to autonomous cars.

Point cloud coding standards have evolved primarily through the development of the well-known MPEG organization. MPEG, short for Moving Picture Experts Group, is one of the main standardization groups dealing with multimedia. In 2017, the MPEG 3D Graphics Coding group (3DG) published a call for proposals (CFP) document to start to develop point cloud coding standard. The final standard will consist in two classes of solutions. Video-based Point Cloud Compression (V-PCC or VPCC) is appropriate for point sets with a relatively uniform distribution of points. Geometry-based Point Cloud Compression (G-PCC or GPCC) is appropriate for more sparse distributions. However, coding efficiency of conventional point cloud coding techniques is generally expected to be further improved.

SUMMARY

Embodiments of the present disclosure provide a solution for point cloud coding.

In a first aspect, a method for point cloud coding is proposed. The method comprises: performing a conversion between a point cloud sequence and a bitstream of the point cloud sequence based on a tile inventory, the tile inventory being valid starting from a first coded point cloud frame in the bitstream, the first coded point cloud frame immediately following a data unit for the tile inventory in a bitstream order, or the first coded point cloud frame following the data unit in the bitstream order and having a frame counter partially indicated in the data unit.

Based on the method in accordance with the first aspect of the present disclosure, the persistency scope of the tile inventory starts from a first coded point cloud frame following the data unit for the tile inventory. Compared with the conventional solution where the persistency scope of the tile inventory is not clearly specified, the persistency scope of the tile inventory is clearly specified in the proposed method and thus the proposed method can advantageously better support the application of the tile inventory and improve the coding efficiency.

In a second aspect, an apparatus for processing point cloud data is proposed. The apparatus for processing point cloud data comprises a processor and a non-transitory memory with instructions thereon. The instructions, upon execution by the processor, cause the processor to perform a method in accordance with the first aspect of the present disclosure.

In a third aspect, a non-transitory computer-readable storage medium is proposed. The non-transitory computer-readable storage medium stores instructions that cause a processor to perform a method in accordance with the first aspect of the present disclosure.

In a fourth aspect, another non-transitory computer-readable recording medium is proposed. The non-transitory computer-readable recording medium stores a bitstream of a point cloud sequence which is generated by a method performed by a point cloud processing apparatus. The method comprises: performing a conversion between the point cloud sequence and the bitstream based on a tile inventory, the tile inventory being valid starting from a first coded point cloud frame in the bitstream, the first coded point cloud frame immediately following a data unit for the tile inventory in a bitstream order, or the first coded point cloud frame following the data unit in the bitstream order and having a frame counter partially indicated in the data unit.

In a fifth aspect, a method for storing a bitstream of a point cloud sequence is proposed. The method comprises: performing a conversion between the point cloud sequence and the bitstream based on a tile inventory, the tile inventory being valid starting from a first coded point cloud frame in the bitstream, the first coded point cloud frame immediately following a data unit for the tile inventory in a bitstream order, or the first coded point cloud frame following the data unit in the bitstream order and having a frame counter partially indicated in the data unit; and storing the bitstream in a non-transitory computer-readable recording medium.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
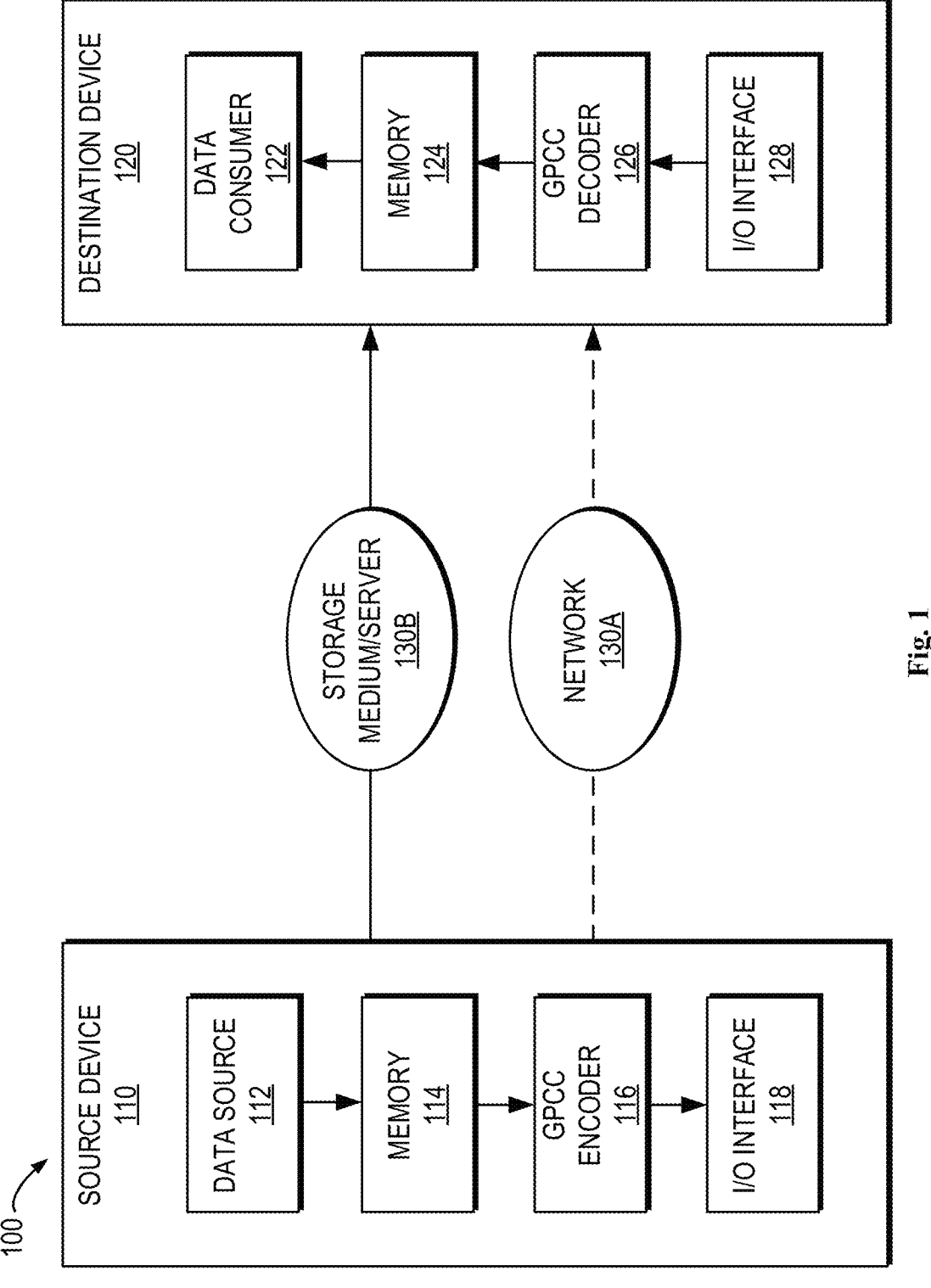
FIG. 1 is a block diagram that illustrates an example point cloud coding system that may utilize the techniques of the present disclosure.

FIG. 1 is a block diagram that illustrates an example point cloud coding system 100 that may utilize the techniques of the present disclosure. As shown, the point cloud coding system 100 may include a source device 110 and a destination device 120. The source device 110 can be also referred to as a point cloud encoding device, and the destination device 120 can be also referred to as a point cloud decoding device. In operation, the source device 110 can be configured to generate encoded point cloud data and the destination device 120 can be configured to decode the encoded point cloud data generated by the source device 110. The techniques of this disclosure are generally directed to coding (encoding and/or decoding) point cloud data, i.e., to support point cloud compression. The coding may be effective in compressing and/or decompressing point cloud data.

Source device 100 and destination device 120 may comprise any of a wide range of devices, including desktop computers, notebook (i.e., laptop) computers, tablet computers, set-top boxes, telephone handsets such as smartphones and mobile phones, televisions, cameras, display devices, digital media players, video gaming consoles, video streaming devices, vehicles (e.g., terrestrial or marine vehicles, spacecraft, aircraft, etc.), robots, LIDAR devices, satellites, extended reality devices, or the like. In some cases, source device 100 and destination device 120 may be equipped for wireless communication.

The source device 100 may include a data source 112, a memory 114, a GPCC encoder 116, and an input/output (I/O) interface 118. The destination device 120 may include an input/output (I/O) interface 128, a GPCC decoder 126, a memory 124, and a data consumer 122. In accordance with this disclosure, GPCC encoder 116 of source device 100 and GPCC decoder 126 of destination device 120 may be configured to apply the techniques of this disclosure related to point cloud coding. Thus, source device 100 represents an example of an encoding device, while destination device 120 represents an example of a decoding device. In other examples, source device 100 and destination device 120 may include other components or arrangements. For example, source device 100 may receive data (e.g., point cloud data) from an internal or external source. Likewise, destination device 120 may interface with an external data consumer, rather than include a data consumer in the same device.

In general, data source 112 represents a source of point cloud data (i.e., raw, unencoded point cloud data) and may provide a sequential series of "frames" of the point cloud data to GPCC encoder 116, which encodes point cloud data for the frames. In some examples, data source 112 generates the point cloud data. Data source 112 of source device 100 may include a point cloud capture device, such as any of a variety of cameras or sensors, e.g., one or more video cameras, an archive containing previously captured point cloud data, a 3D scanner or a light detection and ranging (LIDAR) device, and/or a data feed interface to receive point cloud data from a data content provider. Thus, in some examples, data source 112 may generate the point cloud data based on signals from a LIDAR apparatus. Alternatively or additionally, point cloud data may be computer-generated from scanner, camera, sensor or other data. For example, data source 112 may generate the point cloud data, or produce a combination of live point cloud data, archived point cloud data, and computer-generated point cloud data. In each case, GPCC encoder 116 encodes the captured, pre-captured, or computer-generated point cloud data. GPCC encoder 116 may rearrange frames of the point cloud data from the received order (sometimes referred to as "display order") into a coding order for coding. GPCC encoder 116 may generate one or more bitstreams including encoded point cloud data. Source device 100 may then output the encoded point cloud data via I/O interface 118 for reception and/or retrieval by, e.g., I/O interface 128 of destination device 120. The encoded point cloud data may be transmitted directly to destination device 120 via the I/O interface 118 through the network 130A. The encoded point cloud data may also be stored onto a storage medium/server 130B for access by destination device 120.

Memory 114 of source device 100 and memory 124 of destination device 120 may represent general purpose memories. In some examples, memory 114 and memory 124 may store raw point cloud data, e.g., raw point cloud data from data source 112 and raw, decoded point cloud data from GPCC decoder 126. Additionally or alternatively, memory 114 and memory 124 may store software instructions executable by, e.g., GPCC encoder 116 and GPCC decoder 126, respectively. Although memory 114 and memory 124 are shown separately from GPCC encoder 116 and GPCC decoder 126 in this example, it should be understood that GPCC encoder 116 and GPCC decoder 126 may also include internal memories for functionally similar or equivalent purposes. Furthermore, memory 114 and memory 124 may store encoded point cloud data, e.g., output from GPCC encoder 116 and input to GPCC decoder 126. In some examples, portions of memory 114 and memory 124 may be allocated as one or more buffers, e.g., to store raw, decoded, and/or encoded point cloud data. For instance, memory 114 and memory 124 may store point cloud data.

I/O interface 118 and I/O interface 128 may represent wireless transmitters/receivers, modems, wired networking components (e.g., Ethernet cards), wireless communication components that operate according to any of a variety of IEEE 802.11 standards, or other physical components. In examples where I/O interface 118 and I/O interface 128 comprise wireless components, I/O interface 118 and I/O interface 128 may be configured to transfer data, such as encoded point cloud data, according to a cellular communication standard, such as 4G, 4G-LTE (Long-Term Evolution), LTE Advanced, 5G, or the like. In some examples where I/O interface 118 comprises a wireless transmitter, I/O interface 118 and I/O interface 128 may be configured to transfer data, such as encoded point cloud data, according to other wireless standards, such as an IEEE 802.11 specification. In some examples, source device 100 and/or destination device 120 may include respective system-on-a-chip (SoC) devices. For example, source device 100 may include an SoC device to perform the functionality attributed to GPCC encoder 116 and/or I/O interface 118, and destination device 120 may include an SoC device to perform the functionality attributed to GPCC decoder 126 and/or I/O interface 128.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

I/O interface 128 of destination device 120 receives an encoded bitstream from source device 110. The encoded bitstream may include signaling information defined by GPCC encoder 116, which is also used by GPCC decoder 126, such as syntax elements having values that represent a point cloud. Data consumer 122 uses the decoded data. For example, data consumer 122 may use the decoded point cloud data to determine the locations of physical objects. In some examples, data consumer 122 may comprise a display to present imagery based on the point cloud data.

GPCC encoder 116 and GPCC decoder 126 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of GPCC encoder 116 and GPCC decoder 126 may be included in one or more encoders or decoders, either of which may be integrated as part of a combined encoder/decoder (CODEC) in a respective device. A device including GPCC encoder 116 and/or GPCC decoder 126 may comprise one or more integrated circuits, microprocessors, and/or other types of devices.

GPCC encoder 116 and GPCC decoder 126 may operate according to a coding standard, such as video point cloud compression (VPCC) standard or a geometry point cloud compression (GPCC) standard. This disclosure may generally refer to coding (e.g., encoding and decoding) of frames to include the process of encoding or decoding data. An encoded bitstream generally includes a series of values for syntax elements representative of coding decisions (e.g., coding modes).

A point cloud may contain a set of points in a 3D space, and may have attributes associated with the point. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

Figure 2:
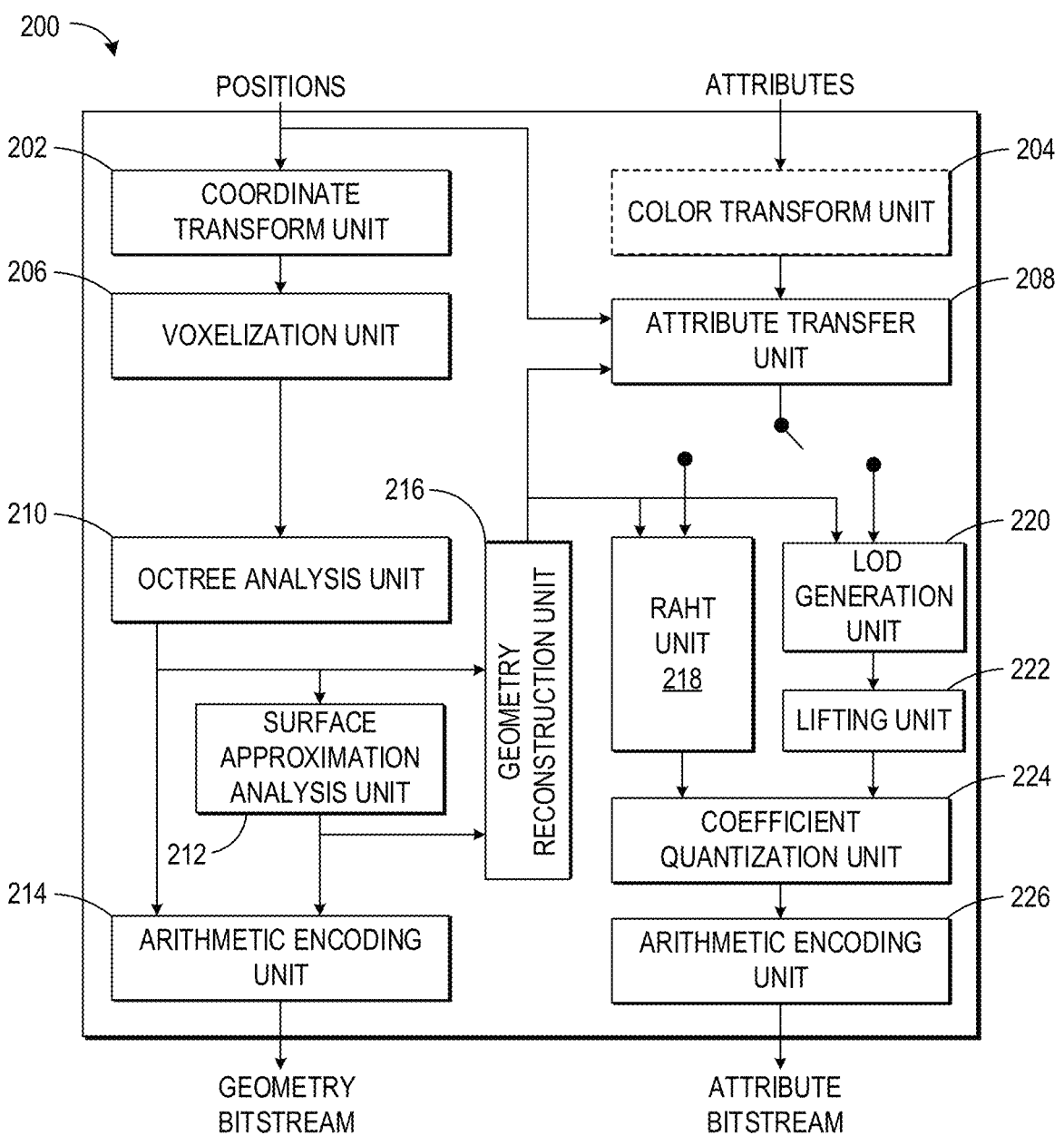
FIG. 2 illustrates a block diagram that illustrates an example point cloud encoder, in accordance with some embodiments of the present disclosure.
Figure 3:
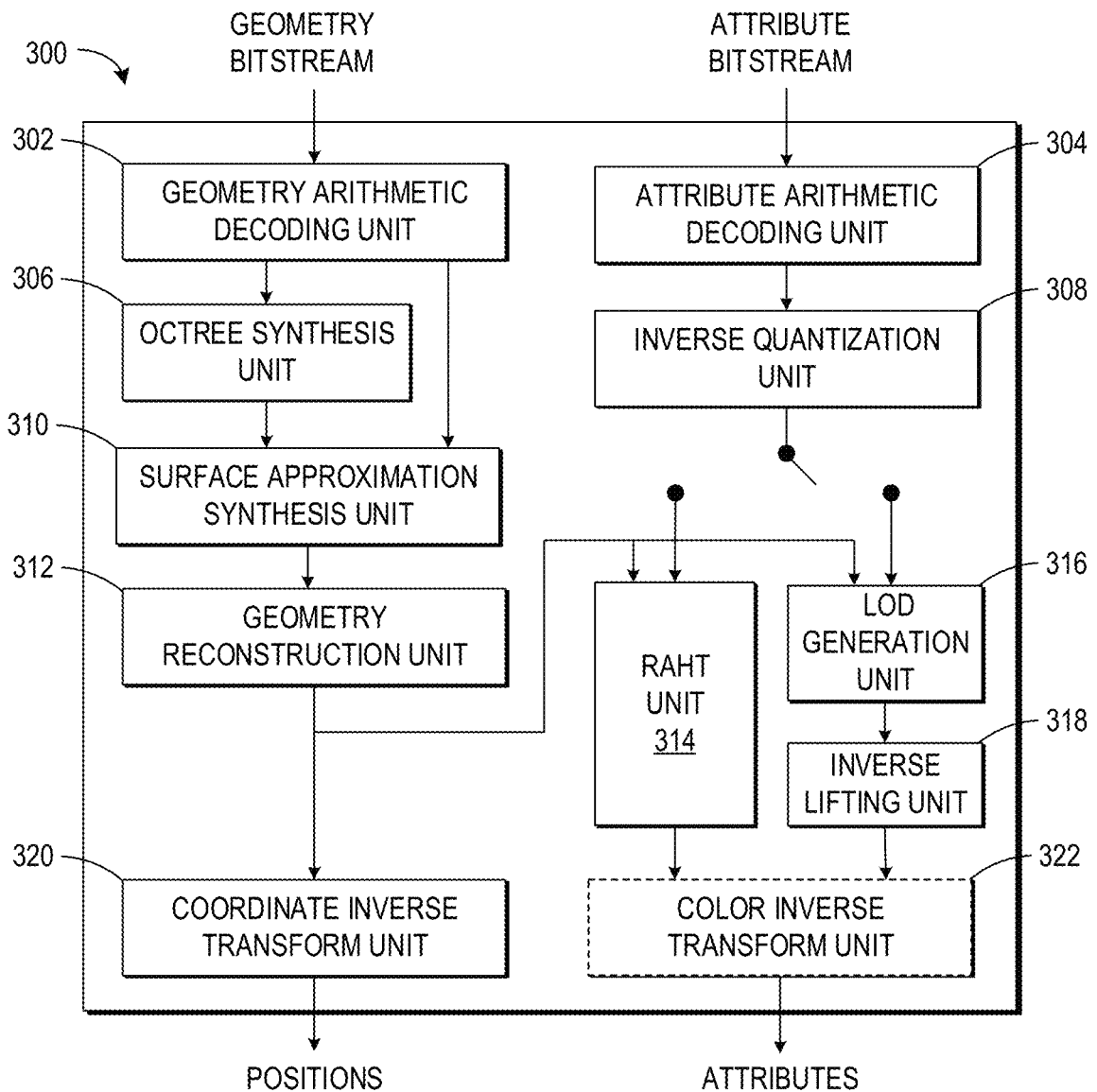
FIG. 3 illustrates a block diagram that illustrates an example point cloud decoder, in accordance with some embodiments of the present disclosure.

FIG. 2 is a block diagram illustrating an example of a GPCC encoder 200, which may be an example of the GPCC encoder 116 in the system 100 illustrated in FIG. 1, in accordance with some embodiments of the present disclosure. FIG. 3 is a block diagram illustrating an example of a GPCC decoder 300, which may be an example of the GPCC decoder 126 in the system 100 illustrated in FIG. 1, in accordance with some embodiments of the present disclosure.

In both GPCC encoder 200 and GPCC decoder 300, point cloud positions are coded first. Attribute coding depends on the decoded geometry. In FIG. 2 and FIG. 3, the region adaptive hierarchical transform (RAHT) unit 218, surface approximation analysis unit 212, RAHT unit 314 and surface approximation synthesis unit 310 are options typically used for Category 1 data. The level-of-detail (LOD) generation unit 220, lifting unit 222, LOD generation unit 316 and inverse lifting unit 318 are options typically used for Category 3 data. All the other units are common between Categories 1 and 3.

For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

In the example of FIG. 2, GPCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226.

As shown in the example of FIG. 2, GPCC encoder 200 may receive a set of positions and a set of attributes. The positions may include coordinates of points in a point cloud. The attributes may include information about points in the point cloud, such as colors associated with points in the point cloud.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform to convert color information of the attributes to a different domain. For example, color transform unit 204 may convert color information from an RGB color space to a YCbCr color space.

Furthermore, in the example of FIG. 2, voxelization unit 206 may voxelize the transform coordinates. Voxelization of the transform coordinates may include quantizing and removing some points of the point cloud. In other words, multiple points of the point cloud may be subsumed within a single "voxel," which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may perform arithmetic encoding on syntax elements representing the information of the octree and/or surfaces determined by surface approximation analysis unit 212. GPCC encoder 200 may output these syntax elements in a geometry bitstream.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud data.

Furthermore, RAHT unit 218 may apply RAHT coding to the attributes of the reconstructed points. Alternatively or additionally, LOD generation unit 220 and lifting unit 222 may apply LOD processing and lifting, respectively, to the attributes of the reconstructed points. RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. GPCC encoder 200 may output these syntax elements in an attribute bitstream.

In the example of FIG. 3, GPCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LOD generation unit 316, an inverse lifting unit 318, a coordinate inverse transform unit 320, and a color inverse transform unit 322.

GPCC decoder 300 may obtain a geometry bitstream and an attribute bitstream. Geometry arithmetic decoding unit 302 of decoder 300 may apply arithmetic decoding (e.g., CABAC or other type of arithmetic decoding) to syntax elements in the geometry bitstream. Similarly, attribute arithmetic decoding unit 304 may apply arithmetic decoding to syntax elements in attribute bitstream.

Octree synthesis unit 306 may synthesize an octree based on syntax elements parsed from geometry bitstream. In instances where surface approximation is used in geometry bitstream, surface approximation synthesis unit 310 may determine a surface model based on syntax elements parsed from geometry bitstream and based on the octree.

Furthermore, geometry reconstruction unit 312 may perform a reconstruction to determine coordinates of points in a point cloud. Coordinate inverse transform unit 320 may apply an inverse transform to the reconstructed coordinates to convert the reconstructed coordinates (positions) of the points in the point cloud from a transform domain back into an initial domain.

Additionally, in the example of FIG. 3, inverse quantization unit 308 may inverse quantize attribute values. The attribute values may be based on syntax elements obtained from attribute bitstream (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. Alternatively, LOD generation unit 316 and inverse lifting unit 318 may determine color values for points of the point cloud using a level of detailbased technique.

Furthermore, in the example of FIG. 3, color inverse transform unit 322 may apply an inverse color transform to the color values. The inverse color transform may be an inverse of a color transform applied by color transform unit 204 of encoder 200. For example, color transform unit 204 may transform color information from an RGB color space to a YCbCr color space. Accordingly, color inverse transform unit 322 may transform color information from the YCbCr color space to the RGB color space.

The various units of FIG. 2 and FIG. 3 are illustrated to assist with understanding the operations performed by encoder 200 and decoder 300. The units may be implemented as fixed-function circuits, programmable circuits, or a combination thereof. Fixed-function circuits refer to circuits that provide particular functionality and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Some exemplary embodiments of the present disclosure will be described in detailed hereinafter. It should be understood that section headings are used in the present document to facilitate ease of understanding and do not limit the embodiments disclosed in a section to only that section. Furthermore, while certain embodiments are described with reference to GPCC or other specific point cloud codecs, the disclosed techniques are applicable to other point cloud coding technologies also. Furthermore, while some embodiments describe point cloud coding steps in detail, it will be understood that corresponding steps decoding that undo the coding will be implemented by a decoder.

1. SUMMARY

This disclosure is related to point cloud compression technologies. Specifically, it is related to the signalling of tiles using the tile inventory data unit in the Geometry based Point Cloud Compression (G-PCC) standard. The ideas may be applied individually or in various combinations, to any point cloud compression standard or non-standard point cloud codec, e.g., the under-development G-PCC standard.

2. ABBREVIATIONS

APS Attribute parameter set
ADU Attribute data unit
DU Data unit
FBDU Frame boundary data unit
FSAP Frame-specific attribute parameters
GDU Geometry data unit
GPS Geometry parameter set
G-PCC Geometry based point cloud compression
LSB Least significant bit
MSB Most significant bit
PCC Point cloud compression
SPS Sequence parameter set
TI Tile inventory

3. BACKGROUND

3.1 General

Advancements in 3D capturing and rendering technologies are enabling new applications and services in the fields of assisted and autonomous driving, maps, cultural heritage, industrial processes, immersive real-time communication, and Virtual/Augmented/Mixed reality (VR/AR/MR) content creation, transmission, and communication. Point clouds have arisen as one of the main representations for such applications.

A point cloud frame consists of a set of 3D points. Each point, in addition to having a 3D position, may also be associated with numerous other attributes such as colour, transparency, reflectance, timestamp, surface normal, and classification. Such representations require a large amount of data, which can be costly in terms of storage and transmission.

The Moving Picture Experts Group (MPEG) has been developing two point cloud compression standards. The first is the Video-based Point Cloud Compression (V-PCC) standard, which is appropriate for point sets with a relatively uniform distribution of points. The second is the Geometry-based Point Cloud Compression (G-PCC) standard, which is appropriate for more sparse distributions.

3.2 Some G-PCC Basic Concepts 3.2.1 Terms and Definitions
point
fundamental element of a point cloud consisting of a position specified as a Cartesian coordinate and zero or more attributes
point cloud
unordered list of points
point cloud sequence
sequence of zero or more point clouds
point cloud frame
point cloud in a point cloud sequence
geometry
point positions associated with a set of points
attribute
scalar or vector property associated with each point in a point cloud
EXAMPLE Colour, reflectance, frame index, etc.
bitstream
sequence of bits that form the representation of a coded point cloud sequence
coded point cloud frame
coded representation of a point cloud frame
bounding box
axis aligned cuboid defining a spatial region that bounds a set of points
tile
set of slices identified by a common slice_tag syntax element value whose geometry is contained within a bounding box specified in a tile inventory data unit
slice
part of, or an entire, coded point cloud frame consisting of a GDU and zero or more corresponding ADUs
Note 1 to entry: the bounding boxes of any two slices may intersect.

3.2.2 Coded Point Cloud Sequence
The coded representation of a point cloud sequence consists of one or more point cloud frames encoded as a sequence of DUs.
The coded point cloud sequence shall consist of:
A SPS that enumerates the attributes present in the coded point cloud format and conveys both metadata and decoding parameters that pertain to the whole coded point cloud sequence.
At least one GPS that conveys parameters used in the decoding of geometry data.
If ADUs are present in the coded point cloud sequence, then at least one APS that conveys parameters used in the decoding of attribute data.
DUs comprising each coded point cloud frame.
Profiles and levels specify limits on the number of bits required to represent geometry and attribute component information.

3.2.3 Coded Point Cloud Frame and Slice
A coded point cloud frame comprises a sequence of zero or more slices with the same value of FrameCtr. An empty frame is indicated using consecutive frame boundary data units.
A code point cloud frame consists of the following data units:
Geometry, attribute, or defaulted attribute data units.
Zero or more frame boundary data units that identify the boundary between two coded point cloud frames.

A slice is an unordered list of points. Slice point positions are coded relative to a slice origin in the coding coordinate system. The coded volumes of slices may intersect, including within a point cloud frame.

Each slice shall consist of a single GDU followed by zero or more ADUs. The GDU header serves as the slice header.

ADUs depend upon the corresponding GDU within the same slice. DUs belonging to different slices shall not be interleaved.

A decoded point cloud frame is the concatenation of all points in all constituent slices of the frame. Coincident points in a point cloud frame may arise from the concatenation of multiple slices. Slices are either independent or dependent. An independent slice does not require any other slice to be decoded first. A dependent slice requires that the immediately preceding slice in bitstream order is decoded first. A slice shall at most be depended upon by a single dependent slice.

3.2.4 Slices and Tiles

A group of slices within a point cloud frame may be identified by a common value of slice_tag.

A tile inventory provides a means to associate a bounding box with a group of slices. Each tile consists of a single bounding box and an identifier (tileId). Tile bounding boxes may overlap.

When a tile inventory is present in the bitstream, slice_tag shall identify a tile by tileId. Otherwise, the use of slice_tag is application specific.

Tile information is not used by the decoding process described in this document. Decoder implementations may use a tile inventory to aid spatial random access.

A decoder that performs spatial random access to decode a region R may use the tile inventory to determine the tileIds of the set of tiles that intersect R. Only slices with matching tileIds need to be decoded.

3.3 G-PCC GDU Header (i.e., Slice Header)

3.3.1 Geometry Data Unit Header Syntax

| | Descriptor |
|---|---|
| geometry_data_unit_header( ) { | |
| gdu_geometry_parameter_set_id | u(4) |
| gdu_reserved_zero_3bits | u(3) |
| slice_id | ue(v) |
| slice_tag | u(v) |
| frame_ctr_lsb | u(v) |
| if( entropy_continuation_enabled ) { | |
| slice_entropy_continuation | u(1) |
| if( slice_entropy_continuation ) | |
| prev_slice_id | ue(v) |
| } | |
| ... | |
| } | |

3.3.2 Geometry Data Unit Header Semantics gdu_geometry_parameter_set_id specifies the value of the active GPS gps_geom_parameter_set_id.

gdu_reserved_zero_3bits shall be equal to 0 in bitstreams conforming to this version of this document. Other values of gdu_reserved_zero_3bits are reserved for future use by ISO/IEC. Decoders shall ignore the value of gdu_reserved_zero_3bits.

slice_id identifies the slice for reference by other syntax elements.

slice_tag may be used to identify one or more slices with a specific value of slice_tag. When a tile inventory data unit is present, slice_tag is a tile id. Otherwise, when a tile inventory data unit is not present, the interpretation of slice_tag is specified by external means.

frame_ctr_lsb specifies the frame_ctr_lsb_bits least significant bits of a notional frame number counter. Consecutive slices with differing values of frame_ctr_lsb form parts of different output point cloud frames. Consecutive slices with identical values of frame_ctr_lsb without an intervening frame boundary marker data unit form parts of the same coded point cloud frame.

It is a requirement of bitstream conformance that each coded point cloud frame shall have a unique value of FrameCtr.

slice_entropy_continuation equal to 1 specifies that the entropy parsing state restoration process (XREF) shall apply to the GDU and any ADUs in the slice. slice_entropy_continuation equal to 0 specifies that the entropy parsing of the GDU and any ADUs in the slice is independent of any other slice. When not present, slice_entropy_continuation shall be inferred to be 0. It is a requirement of bitstream conformance that slice_entropy_continuation is equal to 0 when the GDU is the first DU in a coded point cloud frame.

prev_slice_id shall be equal to the value of slice_id of the preceding GDU in bitstream order. A decoder shall ignore slices where prev_slice_id is both present and not equal to the value of slice_id of the preceding slice.

NOTE It is advised that slice_entropy_continuation should not be equal to 1 if slice_tag is not equal to slice_tag of the GDU identified by prev_slice_id.

. . .

3.4 Tile Inventory

3.4.1 Tile Inventory Syntax

| | Descriptor |
|---|---|
| tile_inventory( ) { | |
| ti_seq_parameter_set_id | u(4) |
| ti_frame_ctr_lsb_bits | u(5) |
| ti_frame_ctr_lsb | u(v) |
| tile_cnt | u(16) |
| if( tile_cnt > 0 ) { | |
| tile_id_bits | u(5) |
| tile_origin_bits_minus1 | u(8) |
| tile_size_bits_minus1 | u(8) |
| for( tileIdx = 0; tileIdx < tile_cnt; tileIdx++ ) { | |
| tile_id[ tileIdx ] | u(v) |
| tileId = tile_id_bits ? tile_is[ tileIdx ] : tileIdx | |
| for( k = 0; k < 3; k++ ) | |
| tile_origin_xyz[ tileId ][ k ] | s(v) |
| for( k = 0; k < 3; k++ ) | |
| tile_size_minus1_xyz[ tileId ][ k ] | u(v) |
| } | |
| ti_origin_bits_minus1 | ue(v) |
| for( k = 0; k < 3; k++ ) | |
| ti_origin_xyz[ k ] | s(v) |
| ti_origin_log2_scale | ue(v) |
| } | |
| byte_alignment( ) | |
| } | |

3.4.2 Tile Inventory Semantics

A tile inventory, when present, contains metadata that defines the spatial regions of zero or more tiles. Each tile is identified by either an implicit or explicit tile id. A tile inventory shall remain valid until it is replaced by another tile inventory.

ti_seq_parameter_set_id specifies the value of the active SPS sps_seq_parameter_set_id.

ti_frame_ctr_lsb_bits specifies the length in bits of the ti_frame_ctr_lsb syntax element.

ti_frame_ctr_lsb specifies the ti_frame_ctr_lsb_bits least significant bits of FrameCtr from which the tile inventory is valid.

tile_cnt specifies the number of tiles present in the tile inventory.

tile_id_bits specifies the length in bits of each tile_id syntax element. tile_id_bits equal to 0 specifies that tiles shall be identified by tileIdx.

tile_origin_bits_minus1 plus 1 specifies the length in bits of each tile_origin_xyz syntax element.

tile_size_bits_minus1 plus 1 specifies the length in bits of each tile_size_minus1_xyz syntax element.

tile_id[tileIdx] specifies the identifier of the tileIdx-th tile in the tile inventory. When tile_id_bits is equal to 0, the value of tile_id[tileIdx] shall be inferred to be tileIdx. It is a requirement of bitstream conformance that all values of tile_id are unique within a tile inventory.

tile_origin_xyz[tileId][k] and tile_size_minus1_xyz[tileId][k] indicate a bounding box in the coding coordinate system encompasing slices identified by slice_tag equal to tileId.

tile_origin_xyz[tileId][k] specifies the k-th component of the (x, y, z) origin coordinate of the tile bounding box relative to TileInventoryOrigin[k].

tile_size_minus1_xyz[tileId][k] plus 1 specifies the k-th component of the tile bounding box width, height, and depth, respectively.

ti_origin_bits_minus1 plus 1 is the length of each ti_origin_xyz syntax element.

ti_origin_xyz[k] and ti_origin_log2_scale together indicate the origin of the coding coordinate system as specified by seq_origin_xyz[k] and seq_origin_log2_scale. The values of ti_origin_xyz[k] and ti_origin_log2_scale should be equal to seq_origin_xyz[k] and seq_origin_log2_scale, respectively.

The tile inventory origin is specified by the expression TileInventoryOrigin[k].

$$TileInventoryOrigin[k]=ti\_origin\_xyz[k]$$
$$<<ti\_origin\_log2\_scale.$$

4. PROBLEMS

The design for the signalling of tiles in the latest draft G-PCC specification has the following problems:

1) The persistency scope of a tile inventory is not clearly specified. The ending of the persistency scope is clear by: "A tile inventory shall remain valid until it is replaced by another tile inventory." The starting of the persistency scope is currently specified by the semantics of ti_frame_ctr_lsb, as follows: "ti_frame_ctr_lsb specifies the ti_frame_ctr_lsb_bits least significant bits of FrameCtr from which the tile inventory is valid." However, this is unclear, because there can be multiple point cloud frames that have the same value of ti_frame_ctr_lsb.

2) A bitstream order restriction of a tile inventory is missing. For example, a tile inventory cannot be included in the bitstream after a coded point cloud frame to which the tile inventory applies.

5. DETAILED SOLUTIONS

To solve the above problem, methods as summarized below are disclosed. The solutions should be considered as examples to explain the general concepts and should not be interpreted in a narrow way. Furthermore, these solutions can be applied individually or combined in any manner.

1) To solve the first and the second problems, the following aspects are specified:
   a. A tile inventory shall remain valid starting from the first coded point cloud frame that follows the tile inventory data unit in bitstream order in the coded point cloud sequence and for which the ti_frame_ctr_lsb_bits least significant bits of the FrameCtr is equal to ti_frame_ctr_lsb, and shall remain valid until the tile inventory is replaced by another tile inventory.
      i. Alternatively, "and shall remain valid until the tile inventory is replaced by another tile inventory" is replaced with "and shall remain valid until the next tile inventory data unit in the coded point cloud sequence in bitstream order".
   b. ti_frame_ctr_lsb specifies the ti_frame_ctr_lsb_bits least significant bits of the FrameCtr of the first coded point cloud frame following the tile inventory data unit in bitstream order in the coded point cloud sequence.

2) Alternatively, it is specified that ti_frame_ctr_lsb specifies the ti_frame_ctr_lsb_bits least significant bits of the FrameCtr of the first coded point cloud frame following the tile inventory data unit in bitstream order in the coded point cloud sequence, and the tile inventory is valid starting from this coded point cloud frame.

3) Alternatively, the syntax elements ti_frame_ctr_lsb_bits and ti_frame_ctr_lsb are removed from the tile_inventory( ) syntax structure, and the following is specified:
   a. A tile inventory shall remain valid starting from the first coded point cloud frame following the tile inventory data unit in bitstream order in the coded point cloud sequence, and shall remain valid until the tile inventory is replaced by another tile inventory.
   b. Alternatively, a tile inventory shall remain valid starting from the first coded point cloud frame that follows the tile inventory data unit in bitstream order in the coded point cloud sequence, and shall remain valid until the next tile inventory data unit the coded point cloud sequence in bitstream order.

4) Alternatively, the syntax elements ti_frame_ctr_lsb_bits and ti_frame_ctr_lsb are removed from the tile_inventory( ) syntax structure, and the following is specified:
   a. A tile inventory shall remain valid starting from the first coded point cloud frame following the tile inventory data unit in bitstream order in the coded point cloud sequence, and shall remain valid until the tile inventory is replaced by another tile inventory or the end of the coded point cloud sequence, whichever is earlier.
   b. Alternatively, a tile inventory shall remain valid starting from the first coded point cloud frame following the tile inventory data unit in bitstream order in the coded point cloud sequence, and shall remain valid until the next tile inventory data unit the coded point cloud sequence in bitstream order or the end of the coded point cloud sequence, whichever is earlier.

6. EMBODIMENTS

Below are some example embodiments for some of the solution items summarized above in Section 5. These embodiments can be applied to G-VVC. Changes are high-lighted, relative to the latest draft G-PCC specification, wherein additions are shown by using bolded words (e.g., this format indicates added text), and deleted parts are shown by using words in italics between double curly brackets (e.g., {{this format indicates deleted text}}). It should be understood that only markings in this section are intended to represent changes relative to the latest draft G-PCC specification.

6.1 Embodiment 1

This embodiment corresponds to item 1, including all its subitems but subitem 1.a.i summarized above in Section 5.

6.1.1 Tile Inventory Semantics

A tile inventory, when present, contains metadata that defines the spatial regions of zero or more tiles. Each tile is identified by either an implicit or explicit tile id. A tile inventory shall remain valid starting from the first coded point cloud frame that follows the tile inventory data unit in bitstream order in the coded point cloud sequence and for which the ti_frame_ctr_lsb_bits least significant bits of the FrameCtr is equal to ti_frame_ctr_lsb, and shall remain valid until it is replaced by another tile inventory.

ti_seq_parameter_set_id specifies the value of the active SPS sps_seq_parameter_set_id.

ti_frame_ctr_lsb_bits specifies the length in bits of the ti_frame_ctr_lsb syntax element.

ti_frame_ctr_lsb specifies the ti_frame_ctr_lsb_bits least significant bits of the FrameCtr of the first coded point cloud frame following the tile inventory data unit in bitstream order in the coded point cloud sequence{{from which the tile inventory is valid}}.

tile_cnt specifies the number of tiles present in the tile inventory.

tile_id_bits specifies the length in bits of each tile_id syntax element. tile_id_bits equal to 0 specifies that tiles shall be identified by tileIdx.

6.2 Embodiment 2

This embodiment corresponds to item 2 summarized above in Section 5.

6.2.1 Tile Inventory Semantics

A tile inventory, when present, contains metadata that defines the spatial regions of zero or more tiles. Each tile is identified by either an implicit or explicit tile id. A tile inventory shall remain valid until it is replaced by another tile inventory.

ti_seq_parameter_set_id specifies the value of the active SPS sps_seq_parameter_set_id.

ti_frame_ctr_lsb_bits specifies the length in bits of the ti_frame_ctr_lsb syntax element.

ti_frame_ctr_lsb specifies the ti_frame_ctr_lsb_bits least significant bits of the FrameCtr of the first coded point cloud frame following the tile inventory data unit in bitstream order in the coded point cloud sequence, {{from which}} and the tile inventory is valid starting from this coded point cloud frame.

tile_cnt specifies the number of tiles present in the tile inventory.

tile_id_bits specifies the length in bits of each tile_id syntax element. tile_id_bits equal to 0 specifies that tiles shall be identified by tileIdx.

6.3 Embodiment 3

This embodiment corresponds to items 3 and 3.a summarized above in Section 5.

6.4 Tile Inventory 6.4.1 Tile Inventory Syntax

|  | Descriptor |
|---|---|
| tile_inventory( ) { |  |
| ti_seq_parameter_set_id | u(4) |
| {{ ti_frame_ctr_lsb_bits}} | {{u(5)}} |
| {{ ti_frame_ctr_lsb}} | {{u(v)}} |
| tile_cnt | u(16) |
| if( tile_cnt > 0 ) { |  |
| tile_id_bits | u(5) |
| tile_origin_bits_minus1 | u(8) |
| tile_size_bits_minus1 | u(8) |
| for( tileIdx = 0; tileIdx < tile_cnt; tileIdx++ ) { |  |
| tile_id[ tileIdx ] | u(v) |
| tileId = tile_id_bits ? tile_id[ tileIdx ] : tileIdx |  |
| for( k = 0; k< 3; k++ ) |  |
| tile_organ_xyz[ tileId ][ k ] | s(v) |
| for( k = 0; k < 3; k++ ) |  |
| tile_size_minus1_xyz[ tileId ][ k ] | u(v) |
| } |  |
| ti_origin_bits_minus1 | ue(v) |
| for( k = 0; k < 3; k++ ) |  |
| ti_origin_xyz[ k ] | s(v) |
| ti_origin_log2_scale | ue(v) |
| } |  |
| byte_alignment( ) |  |
| } |  |

6.4.2 Tile Inventory Semantics

A tile inventory, when present, contains metadata that defines the spatial regions of zero or more tiles. Each tile is identified by either an implicit or explicit tile id. A tile inventory shall remain valid starting from the first coded point cloud frame following the tile inventory data unit in bitstream order in the coded point cloud sequence, and shall remain valid until it is replaced by another tile inventory.

ti_seq_parameter_set_id specifies the value of the active SPS sps_seq_parameter_set_id. {{ti_frame_ctr_lsb-_bits specifies the length in bits of the ti_frame_ctr_lsb syntax element. ti_frame_ctr_lsb specifies the ti_fr-ame_ctr_lsb_bits least significant bits of FrameCtr from which the tile inventory is valid.}} tile_cnt specifies the number of tiles present in the tile inventory.

tile_id_bits specifies the length in bits of each tile_id syntax element. tile_id_bits equal to 0 specifies that tiles shall be identified by tileIdx.

More details of the embodiments of the present disclosure will be described below which are related to signaling of tiles in geometry based point cloud compression.

As used herein, the term "point cloud sequence" may refer to a sequence of zero or more point clouds. The term "point cloud frame" may refer to a point cloud in a point cloud sequence. The term "coded point cloud frame" may refer to coded representation of a point cloud frame. The term "bounding box" may refer to an axis aligned cuboid defining a spatial region that bounds a set of points. The term "slice" may refer to part of, or an entire, coded point cloud frame consisting of a geometry data unit (GDU) and zero or more corresponding attribute data units (ADUs).

Figure 4:
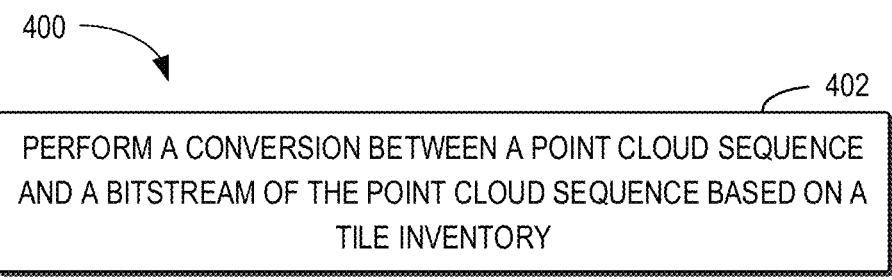
FIG. 4 illustrates a flowchart of a method for point cloud coding in accordance with some embodiments of the present disclosure.

FIG. 4 illustrates a flowchart of a method 400 for point cloud coding in accordance with some embodiments of the present disclosure. As shown in FIG. 4, at 402, a conversion between a point cloud sequence and a bitstream of the point cloud sequence is performed based on a tile inventory. The tile inventory associates a bounding box with a group of slices.

In some embodiments, the point cloud sequence may be encoded into the bitstream during the conversion at 402. Additionally or alternatively, the point cloud sequence may be decoded from the bitstream during the conversion at 402.

During the conversion at 402, the tile inventory is valid starting from a first coded point cloud frame in the bitstream. In other words, the tile inventory is valid for the first coded point cloud frame and a set of coded point cloud frames following the first coded point cloud frame in a bitstream order. In some embodiments, the first coded point cloud frame immediately follows a data unit for the tile inventory (also referred to as "tile inventory data unit" hereinafter) in a bitstream order. Alternatively, the first coded point cloud frame follows the tile inventory data unit in the bitstream order and has a frame counter partially indicated in the data unit.

In some embodiments, the data unit may comprise a first syntax element (such as syntax element ti_frame_ctr_lsb) indicating a first number of least significant bits of the frame counter of the first coded point cloud frame, and the data unit may further comprise a second syntax element (such as syntax element ti_frame_ctr_lsb_bits) indicating the first number. In one example, the bitstream may comprise a plurality of coded point cloud frames following the tile inventory data unit. Each of the plurality of coded point cloud frames has a frame counter comprising the first number of least significant bits. The first coded point cloud frame is closest to the tile inventory data unit among the plurality of coded point cloud frames.

In view of the above, the persistency scope of the tile inventory starts from the first coded point cloud frame following the tile inventory data unit. Compared with the conventional solution where the persistency scope of the tile inventory is not clearly specified, the persistency scope of the tile inventory is clearly specified in the proposed method and thus the proposed method can advantageously better support the application of the tile inventory and improve the coding efficiency.

In some embodiments, the tile inventory may remain valid for at least one coded point cloud frame following the first coded point cloud frame, until the tile inventory is replaced by a further tile inventory for a further coded point cloud frame in the bitstream. In one example, the syntax elements ti_frame_ctr_lsb_bits and ti_frame_ctr_lsb are removed from the syntax structure tile_inventory( ), and the following is specified: A tile inventory shall remain valid starting from the first coded point cloud frame following the tile inventory data unit in bitstream order in the coded point cloud sequence, and shall remain valid until the tile inventory is replaced by another tile inventory.

Alternatively, the tile inventory may remain valid for at least one coded point cloud frame following the first coded point cloud frame, until a further data unit for a further tile inventory is coded. The further tile inventory data unit may follow the tile inventory data unit in the bitstream order and the further tile inventory may be valid starting from a further coded point cloud frame in the bitstream. In one example, the syntax elements ti_frame_ctr_lsb_bits and ti_frame_ctr_lsb are removed from the syntax structure tile_inventory( ), and the following is specified: a tile inventory shall remain valid starting from the first coded point cloud frame that follows the tile inventory data unit in bitstream order in the coded point cloud sequence, and shall remain valid until the next tile inventory data unit the coded point cloud sequence in bitstream order.

In some alternative embodiments, the tile inventory may remain valid for at least one coded point cloud frame following the first coded point cloud frame until a time instant. The time instant may be an earlier one of the following: a time instant when the tile inventory is replaced by a further tile inventory for a further coded point cloud frame in the bitstream, or an ending time of a coded point cloud sequence associated with the point cloud sequence. By way of example, the syntax elements ti_frame_ctr_lsb_bits and ti_frame_ctr_lsb are removed from the syntax structure tile_inventory( ), and the following is specified: a tile inventory shall remain valid starting from the first coded point cloud frame following the tile inventory data unit in bitstream order in the coded point cloud sequence, and shall remain valid until the tile inventory is replaced by another tile inventory or the end of the coded point cloud sequence, whichever is earlier.

Alternatively, the time instant may be an earlier one of following: a time instant when a further data unit for a further tile inventory is coded, or an ending time of a coded point cloud sequence associated with the point cloud sequence. The further data unit may follow the data unit in the bitstream order and the further tile inventory may be valid starting from a further coded point cloud frame in the bitstream. By way of example, the syntax elements ti_frame_ctr_lsb_bits and ti_frame_ctr_lsb are removed from the syntax structure tile_inventory( ), and the following is specified: a tile inventory shall remain valid starting from the first coded point cloud frame following the tile inventory data unit in bitstream order in the coded point cloud sequence, and shall remain valid until the next tile inventory data unit the coded point cloud sequence in bitstream order or the end of the coded point cloud sequence, whichever is earlier.

According to embodiments of the present disclosure, a non-transitory computer-readable recording medium is proposed. A bitstream of a point cloud sequence is stored in the non-transitory computer-readable recording medium. The bitstream can be generated by a method performed by a point cloud processing apparatus. According to the method, a conversion between a point cloud sequence and a bitstream of the point cloud sequence is performed based on a tile inventory. The tile inventory is valid starting from a first coded point cloud frame in the bitstream. The first coded point cloud frame immediately follows a data unit for the tile inventory in a bitstream order, or the first coded point cloud frame follows the data unit in the bitstream order and has a frame counter partially indicated in the data unit.

According to embodiments of the present disclosure, a method for storing a bitstream of a point cloud sequence is proposed. In the method, a conversion between a point cloud sequence and a bitstream of the point cloud sequence is performed based on a tile inventory. The tile inventory is valid starting from a first coded point cloud frame in the bitstream. The first coded point cloud frame immediately follows a data unit for the tile inventory in a bitstream order, or the first coded point cloud frame follows the data unit in the bitstream order and has a frame counter partially indicated in the data unit. The bitstream is stored in the non-transitory computer-readable recording medium.

Implementations of the present disclosure can be described in view of the following clauses, the features of which can be combined in any reasonable manner.

Clause 1. A method for point cloud coding, comprising: performing a conversion between a point cloud sequence and a bitstream of the point cloud sequence based on a tile inventory, the tile inventory being valid starting from a first coded point cloud frame in the bitstream, the first coded point cloud frame immediately following a data unit for the tile inventory in a bitstream order, or the first coded point cloud frame following the data unit in the bitstream order and having a frame counter partially indicated in the data unit.

Clause 2. The method of clause 1, wherein the data unit comprises a first syntax element indicating a first number of least significant bits of the frame counter and a second syntax element indicating the first number.

Clause 3. The method of clause 2, wherein the bitstream comprises a plurality of coded point cloud frames following the data unit, each of the plurality of coded point cloud frames has a frame counter comprising the first number of least significant bits, and the first coded point cloud frame is closest to the data unit among the plurality of coded point cloud frames.

Clause 4. The method of any of clauses 2-3, wherein the first syntax element is syntax element ti_frame_ctr_lsb, and the second syntax element is syntax element ti_frame_ctr_lsb_bits.

Clause 5. The method of any of clauses 1-4, wherein the tile inventory remains valid for at least one coded point cloud frame following the first coded point cloud frame, until the tile inventory is replaced by a further tile inventory for a further coded point cloud frame in the bitstream.

Clause 6. The method of any of clauses 1-4, wherein the tile inventory remains valid for at least one coded point cloud frame following the first coded point cloud frame, until a further data unit for a further tile inventory is coded, the further data unit following the data unit in the bitstream order and the further tile inventory being valid starting from a further coded point cloud frame in the bitstream.

Clause 7. The method of any of clauses 1-4, wherein the tile inventory remains valid for at least one coded point cloud frame following the first coded point cloud frame until a time instant, the time instant being an earlier one of following: a time instant when the tile inventory is replaced by a further tile inventory for a further coded point cloud frame in the bitstream, or an ending time of a coded point cloud sequence associated with the point cloud sequence.

Clause 8. The method of any of clauses 1-4, wherein the tile inventory remains valid for at least one coded point cloud frame following the first coded point cloud frame until a time instant, the time instant being an earlier one of following: a time instant when a further data unit for a further tile inventory is coded, the further data unit following the data unit in the bitstream order and the further tile inventory being valid starting from a further coded point cloud frame in the bitstream, or an ending time of a coded point cloud sequence associated with the point cloud sequence.

Clause 9. The method of any of clauses 1-8, wherein the conversion includes encoding the point cloud sequence into the bitstream.

Clause 10. The method of any of clauses 1-8, wherein the conversion includes decoding the point cloud sequence from the bitstream.

Clause 11. An apparatus for processing point cloud data comprising a processor and a non-transitory memory with instructions thereon, wherein the instructions upon execution by the processor, cause the processor to perform a method in accordance with any of clauses 1-10.

Clause 12. A non-transitory computer-readable storage medium storing instructions that cause a processor to perform a method in accordance with any of clauses 1-10.

Clause 13. A non-transitory computer-readable recording medium storing a bitstream of a point cloud sequence which is generated by a method performed by a point cloud processing apparatus, wherein the method comprises: performing a conversion between the point cloud sequence and the bitstream based on a tile inventory, the tile inventory being valid starting from a first coded point cloud frame in the bitstream, the first coded point cloud frame immediately following a data unit for the tile inventory in a bitstream order, or the first coded point cloud frame following the data unit in the bitstream order and having a frame counter partially indicated in the data unit.

Clause 14. A method for storing a bitstream of a point cloud sequence, comprising: performing a conversion between the point cloud sequence and the bitstream based on a tile inventory, the tile inventory being valid starting from a first coded point cloud frame in the bitstream, the first coded point cloud frame immediately following a data unit for the tile inventory in a bitstream order, or the first coded point cloud frame following the data unit in the bitstream order and having a frame counter partially indicated in the data unit; and storing the bitstream in a non-transitory computer-readable recording medium.

Example Device

Figure 5:
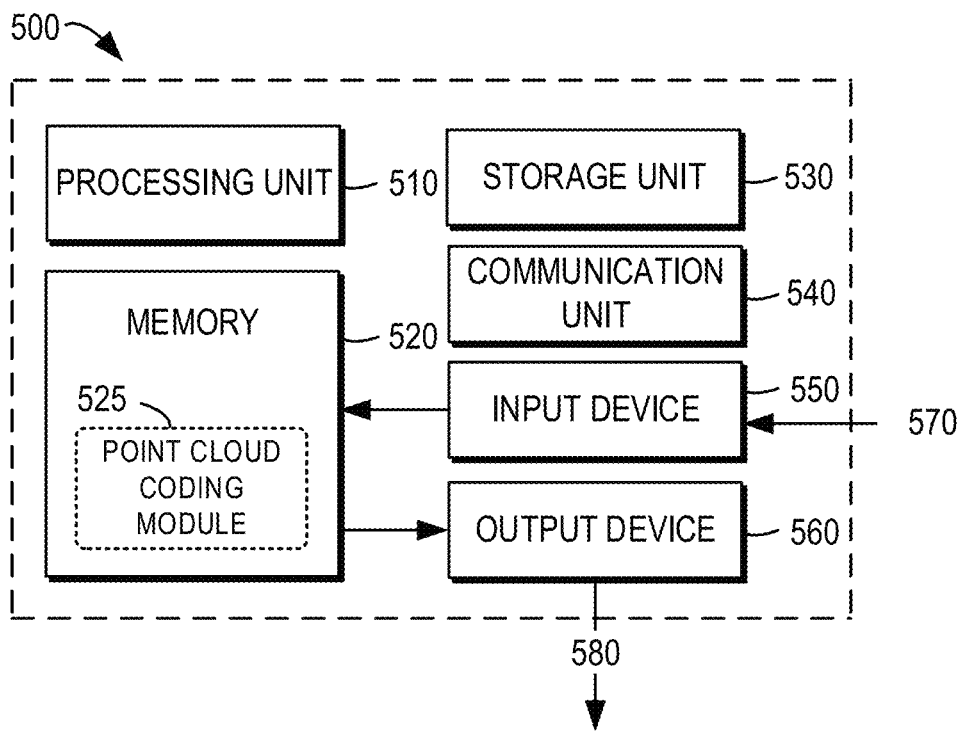
FIG. 5 illustrates a block diagram of a computing device in which various embodiments of the present disclosure can be implemented.

FIG. 5 illustrates a block diagram of a computing device 500 in which various embodiments of the present disclosure can be implemented. The computing device 500 may be implemented as or included in the source device 110 (or the GPCC encoder 116 or 200) or the destination device 120 (or the GPCC decoder 126 or 300).

It would be appreciated that the computing device 500 shown in FIG. 5 is merely for purpose of illustration, without suggesting any limitation to the functions and scopes of the embodiments of the present disclosure in any manner.

As shown in FIG. 5, the computing device 500 includes a general-purpose computing device 500. The computing device 500 may at least comprise one or more processors or processing units 510, a memory 520, a storage unit 530, one or more communication units 540, one or more input devices 550, and one or more output devices 560.

In some embodiments, the computing device 500 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 500 can support any type of interface to a user (such as "wearable" circuitry and the like).

The processing unit 510 may be a physical or virtual processor and can implement various processes based on programs stored in the memory 520. In a multi-processor system, multiple processing units execute computer executable instructions in parallel so as to improve the parallel processing capability of the computing device 500. The processing unit 510 may also be referred to as a central processing unit (CPU), a microprocessor, a controller or a microcontroller.

The computing device 500 typically includes various computer storage medium. Such medium can be any medium accessible by the computing device 500, including, but not limited to, volatile and non-volatile medium, or detachable and non-detachable medium. The memory 520 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 530 may be any detachable or non-detachable medium and may include a machine-readable medium such as a memory, flash memory drive, magnetic disk or another other media, which can be used for storing information and/or data and can be accessed in the computing device 500.

The computing device 500 may further include additional detachable/non-detachable, volatile/non-volatile memory medium. Although not shown in FIG. 5, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 540 communicates with a further computing device via the communication medium. In addition, the functions of the components in the computing device 500 can be implemented by a single computing cluster or multiple computing machines that can communicate via communication connections. Therefore, the computing device 500 can operate in a networked environment using a logical connection with one or more other servers, networked personal computers (PCs) or further general network nodes.

The input device 550 may be one or more of a variety of input devices, such as a mouse, keyboard, tracking ball, voice-input device, and the like. The output device 560 may be one or more of a variety of output devices, such as a display, loudspeaker, printer, and the like. By means of the communication unit 540, the computing device 500 can further communicate with one or more external devices (not shown) such as the storage devices and display device, with one or more devices enabling the user to interact with the computing device 500, or any devices (such as a network card, a modem and the like) enabling the computing device 500 to communicate with one or more other computing devices, if required. Such communication can be performed via input/output (I/O) interfaces (not shown).

In some embodiments, instead of being integrated in a single device, some or all components of the computing device 500 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 500 may be used to implement point cloud encoding/decoding in embodiments of the present disclosure. The memory 520 may include one or more point cloud coding modules 525 having one or more program instructions. These modules are accessible and executable by the processing unit 510 to perform the functionalities of the various embodiments described herein.

In the example embodiments of performing point cloud encoding, the input device 550 may receive point cloud data as an input 570 to be encoded. The point cloud data may be processed, for example, by the point cloud coding module 525, to generate an encoded bitstream. The encoded bitstream may be provided via the output device 560 as an output 580.

In the example embodiments of performing point cloud decoding, the input device 550 may receive an encoded bitstream as the input 570. The encoded bitstream may be processed, for example, by the point cloud coding module 525, to generate decoded point cloud data. The decoded point cloud data may be provided via the output device 560 as the output 580.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

I claim:

1. A method for point cloud coding, comprising:
   performing a conversion between a point cloud sequence and a bitstream of the point cloud sequence based on a tile inventory, the tile inventory being valid starting from the first coded point cloud frame following a data unit for the tile inventory.

2. The method of claim 1, wherein a frame counter of the first coded point cloud frame is partially indicated in the data unit.

3. The method of claim 2, wherein the data unit comprises a first syntax element indicating a first number of least significant bits of the frame counter and a second syntax element indicating the first number.

4. The method of claim 3, wherein the bitstream comprises a plurality of coded point cloud frames following the data unit, each of the plurality of coded point cloud frames has a frame counter comprising the first number of least significant bits, and the first coded point cloud frame is closest to the data unit among the plurality of coded point cloud frames.

5. The method of claim 3, wherein the first syntax element is syntax element ti_frame_ctr_lsb, and the second syntax element is syntax element ti_frame_ctr_lsb bits.

6. The method of claim 1, wherein the tile inventory remains valid for at least one coded point cloud frame following the first coded point cloud frame, until the tile inventory is replaced by a further tile inventory for a further coded point cloud frame in the bitstream.

7. The method of claim 1, wherein the tile inventory remains valid for at least one coded point cloud frame following the first coded point cloud frame, until a further data unit for a further tile inventory is coded, the further data unit following the data unit and the further tile inventory being valid starting from a further coded point cloud frame in the bitstream.

8. The method of claim 1, wherein the tile inventory remains valid for at least one coded point cloud frame following the first coded point cloud frame until a time instant, the time instant being an earlier one of following:

a time instant when the tile inventory is replaced by a further tile inventory for a further coded point cloud frame in the bitstream, or an ending time of a coded point cloud sequence associated with the point cloud sequence.

9. The method of claim 1, wherein the tile inventory remains valid for at least one coded point cloud frame following the first coded point cloud frame until a time instant, the time instant being an earlier one of following:

a time instant when a further data unit for a further tile inventory is coded, the further data unit following the data unit and the further tile inventory being valid starting from a further coded point cloud frame in the bitstream, or an ending time of a coded point cloud sequence associated with the point cloud sequence.

10. The method of claim 1, wherein the conversion includes encoding the point cloud sequence into the bitstream.

11. The method of claim 1, wherein the conversion includes decoding the point cloud sequence from the bitstream.

12. An apparatus for processing point cloud data comprising a processor and a non-transitory memory with instructions thereon, wherein the instructions upon execution by the processor, cause the processor to perform acts comprising:

performing a conversion between a point cloud sequence and a bitstream of the point cloud sequence based on a tile inventory, the tile inventory being valid starting from the first coded point cloud frame following a data unit for the tile inventory.

13. The apparatus of claim 12, wherein a frame counter of the first coded point cloud frame is partially indicated in the data unit.

14. The apparatus of claim 13, wherein the data unit comprises a first syntax element indicating a first number of least significant bits of the frame counter and a second syntax element indicating the first number.

15. The apparatus of claim 14, wherein the first syntax element is syntax element ti_frame_ctr_lsb, and the second syntax element is syntax element ti_frame_ctr_lsb_bits.

16. A non-transitory computer-readable storage medium storing instructions that cause a processor to perform acts comprising:

performing a conversion between a point cloud sequence and a bitstream of the point cloud sequence based on a tile inventory, the tile inventory being valid starting from the first coded point cloud frame following a data unit for the tile inventory.

17. The non-transitory computer-readable storage medium of claim 16, wherein a frame counter of the first coded point cloud frame is partially indicated in the data unit.

18. The non-transitory computer-readable storage medium of claim 17, wherein the data unit comprises a first syntax element indicating a first number of least significant bits of the frame counter and a second syntax element indicating the first number.

19. The non-transitory computer-readable storage medium of claim 18, wherein the first syntax element is syntax element ti_frame_ctr_lsb, and the second syntax element is syntax element ti_frame_ctr_lsb bits.

20. A method for storing a bitstream of a point cloud sequence, comprising:

performing a conversion between the point cloud sequence and the bitstream based on a tile inventory, the tile inventory being valid starting from the first coded point cloud frame following a data unit for the tile inventory; and storing the bitstream in a non-transitory computer-readable recording medium.

* * * * *